No. 879,100. PATENTED FEB. 11, 1908.
C. R. GREUTER.
FRICTION CLUTCH.
APPLICATION FILED FEB. 7, 1906.
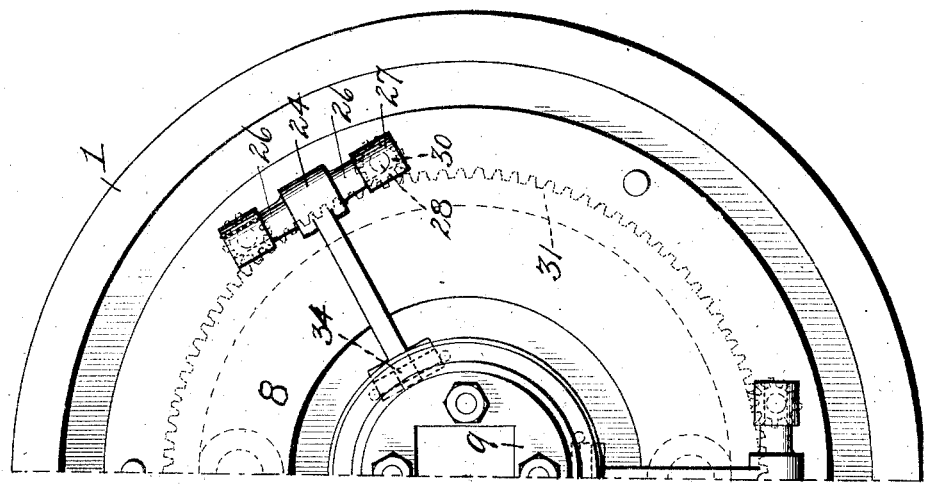
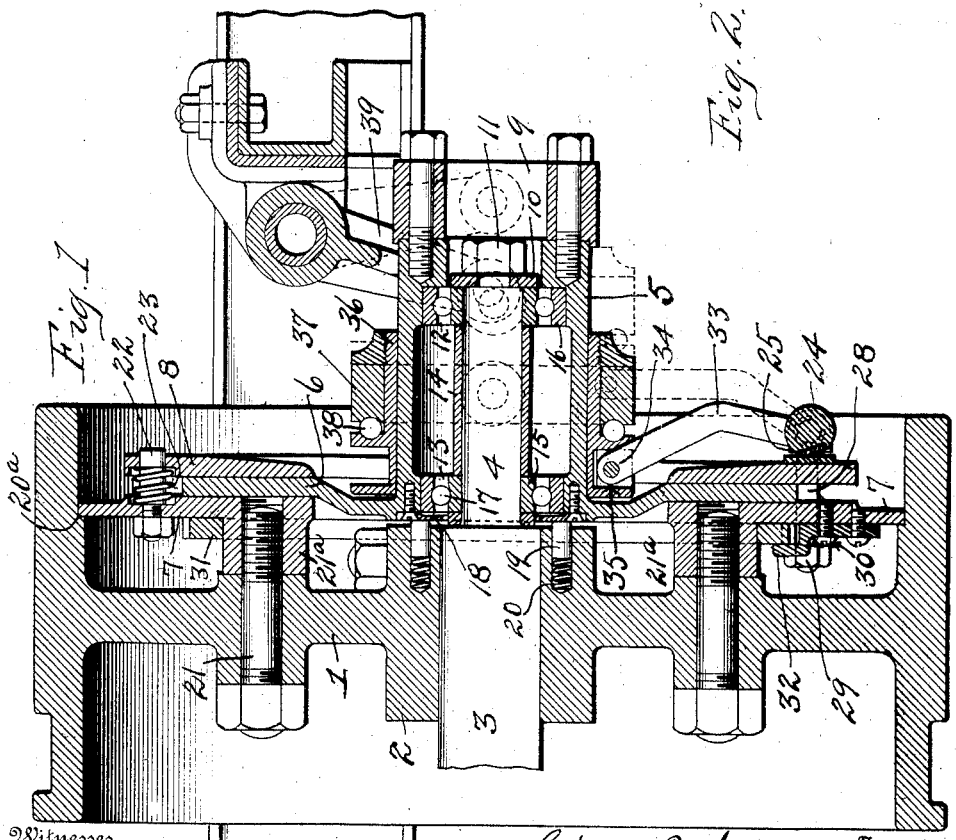

UNITED STATES PATENT OFFICE.

CHARLES R. GREUTER, OF HOLYOKE, MASSACHUSETTS, ASSIGNOR TO MATHESON MOTOR CAR COMPANY, OF WILKES-BARRE, PENNSYLVANIA, A CORPORATION.

FRICTION-CLUTCH.

No. 879,100.　　Specification of Letters Patent.　　Patented Feb. 11, 1908.

Application filed February 7, 1906. Serial No. 299,970.

*To all whom it may concern:*

Be it known that I, CHARLES R. GREUTER, a citizen of the United States, and a resident of Holyoke, in the county of Hampden and State of Massachusetts, have invented a certain new and useful Improvement in Friction-Clutches, of which the following is a specification.

This invention relates to machine clutches, and has special reference to that type of friction clutches known as a disk clutch.

To this end the invention contemplates a simple, practical and thoroughly efficient construction of disk clutch possessing special utility in connection with the shaft transmission of automobile motors and like machines. While of special importance in this application the invention, as a friction clutch, is necessarily capable of general application as a power clutch for all purposes.

The essential features of the invention involved in the novel construction and relation of parts, are necessarily susceptible to structural modification without departing from the scope of the present invention, a preferred embodiment of which is shown in the accompanying drawings, in which Figure 1 is a central vertical sectional view of a friction disk clutch embodying the present invention; Fig. 2 is a half elevation of the clutch.

Like references designate corresponding parts in the figures of the drawings.

The clutch structure contemplated by the present invention is associated directly with the fly or other suitable wheel of the machine, designated in the drawings by the numeral 1, and which will be referred to herein as the "wheel member of the clutch".

The wheel member 1 is provided with the usual hub 2 fitted to the driving or other motor shaft 3, which in the present invention is formed with a shaft extension 4 projecting beyond the plane of one side of the wheel member and constituting a supporting journal for rotary parts of the clutch. The main member of the clutch which is supported by the shaft extension or journal 4 is the rotatable hub sleeve 5 essentially consisting of a hollow shell or sleeve and provided at its inner end with a rigid circular friction disk 6 formed integrally or otherwise rigidly united to the body of the hub sleeve so as to constitute a rigid member thereof. This friction disk 6 is disposed at right angles to the longitudinal axis of the hub sleeve 5, and therefore being arranged radially thereto is designed to operate between the opposing fixed and movable clutch shoes 7 and 8 respectively, which will hereinafter be more particularly referred to.

In addition to the rigid friction disk 6 at its inner end the hub sleeve 5 of the clutch is designed to have suitably secured to its outer end a transmission shaft fitting or coupling 9 of suitable form and construction to provide for the proper coupling of the transmission or other shaft to the disk or sleeve member 5 and the clutch proper. Various expedients may be resorted to for effecting this mechanical connection which forms no part of the present invention.

The disk or sleeve member 5 of the clutch is held in proper position upon the supporting journal 4 through the medium of a retaining plate 10 held to the outer end of the journal 4 by means of the bolt or equivalent fastening 11, and arranged to overlap a part of the outer anti-friction bearing 12 for the member or sleeve 5. The latter is also provided with an inner anti-friction bearing 13 for the inner end portion thereof, said two bearings 12 and 13 being preferably of duplicate construction. The said bearings 12 and 13 are respectively arranged within opposite end portions of the shell constituting the sleeve 5 and are held in proper spaced relation by means of an interposed shaft bushing 14 fitted on the journal 4, and each of said bearings essentially consist of the concentric spaced race-rings 15 and 16 fitted respectively to the journal 4 and to the sleeve 5, together with anti-friction bearing balls or rollers 17 interposed between the two rings. As a structural part of the disk or sleeve member 5 the latter has fitted to the inner end thereof adjacent to the wheel hub 2 a bearing guard ring 18 lying between the inner bearing 13 and the wheel hub 2. There is associated with the said guard ring 18 a series of spring projected bearing plungers 19 seated in housing sockets 20 formed in one end of the wheel hub 2 and held under spring pressure against the face of the ring 18, thereby maintaining a substantial guard for the inner bearing 13 while at the same time permitting the free relative rotation of the wheel member 1 and the sleeve member 5 carrying the disk 6. The purpose of the spring pressed pins 19 also is to hold the clutch member 6 out of engagement with the friction plate 7 when the clutch is inoperative.

The fixed clutch shoe 7 is in the form of a ring arranged within the wheel member 1, seated against the shouldered seat 20ª formed in the rim portion of the wheel member and securely bolted to the latter through the medium of a plurality of fastening bolts 21 extending through the web or spokes of the wheel member and engaging the threaded bolt collars 21ª projecting from the inner side of the fixed shoe or ring 7.

The outer movable clutch shoe 8 is likewise in the form of a ring loosely mounted on a series of supporting and guiding pins 22 projecting from the fixed shoe 7 and normally held in inoperative position by release springs 23 coiled on said pin and interposed between the two clutch shoes 7 and 8. The movable shoe 8 is moved inward to clutch the friction disk 6 under the influence of a plurality of clutching or rocker-cams 24. Any suitable number of these cams may be employed, arranged in a circular series, and each of the same essentially consists of a short rock shaft section provided with the eccentric cam face 25 and the oppositely projecting journal spindles 26 having a bearing in the oppositely arranged bearing lugs 27 arranged at the outer side of the movable shoe 8 and carried at the outer end of the adjustable carrier bolts 28. A pair of these bolts is associated with each cam 24 and extend through openings in the clutch shoes 7 and 8. The inner threaded end of each of said bolts receives thereon an adjusting nut 29 carrying a pinion 30 meshing with a common adjustment rack 31. This rack is of ring form and is arranged within suitable guiding keepers 32 at the inner side of the shoe 7 and meshes with the pinions of all of the nuts 29 so that an adjustment of one of said nuts will secure a corresponding adjustment of all the others and consequently provide a simple means for uniformly adjusting the positions of all of the rocker cams 24 according to the degree of friction desired for the clutch.

Each rocker cam 24 is provided with a centrally arranged cam lever 33 whose inner end is pivotally connected with a pivot block 34 formed in the shipper groove 35 of a sliding clutch collar 36 movable upon the hub sleeve 5. The said clutch collar also has fitted thereon a coupling ring 37 having a ball bearing mounting 38 and adapted to have pivotally coupled thereto the shipper lever or connection 39 controlled by the operator for sliding the collar 36 upon the hub sleeve 5 of the clutch.

Upon outward movement of the clutch collar 36 the cams 24 are rocked in a direction for releasing their cam faces from the movable clutch shoe 8, thereby permitting the release springs 23 to take off the friction of the shoe 8 from the disk 6, and thereby release the clutch. The opposite or inward movement of the clutch collar brings the cam faces or edges of the cams against the shoe 8 so as to force the latter into frictional clutching engagement with the disk 6.

I claim:—

1. In a clutch, the combination with the wheel member, of a fixed clutch shoe consisting of a ring bolted to the wheel member and seated against its rim portion, a spring released movable clutch shoe loosely supported at one side of the fixed shoe, a rotatable hub arranged at one side of the wheel member and carrying a friction disk located between the two shoes, and a plurality of suitably-actuated rocker cams supported at one side of the movable shoe and operating against the same.

2. The combination with a wheel member carrying a fixed clutch shoe, a spring actuated movable clutch shoe loosely supported at one side of the fixed shoe, a rotatable hub carrying a friction disk located between the two shoes, centrally arranged spring releasing means for the friction disk, and operating cams working against the movable shoe.

3. In a clutch, a wheel member carrying a fixed shoe, a spring-released movable shoe arranged at one side of and loosely supported from the fixed shoe, a supporting journal extending beyond one side of the wheel member, a rotatable hub sleeve mounted on said journal and carrying a frictional disk arranged between the two shoes and a plurality of suitably supported cams operating against the movable shoe and having lever arms pivotally connected with said hub sleeve.

4. In a clutch, a wheel member carrying a fixed shoe, a movable shoe arranged at one side of the fixed shoe, a rotary clutch member having a friction disk arranged between the two shoes, releasing means for the friction disk, a plurality of rocker cams arranged to operate against the outer side of the movable shoe, and each provided with a lever and with journal spindles, adjustable carrying bolts extending through the shoes and provided with bearings for the journal spindles of the roller cams, adjusting nuts mounted on the threaded ends of said bolts and carrying pinions, and an adjustment rack common to all the adjusting nuts and arranged to mesh with the pinions thereof.

5. In a clutch, a wheel member carrying a fixed shoe, a movable shoe arranged at one side of the fixed shoe, a rotary hub having internal supporting bearings and provided with a friction disk arranged between the two shoes, adjusting means for the movable shoe, a guard ring secured fast to the hub and overlapping one of the bearings thereof and a plurality of spring projected plungers mounted in the hub of the wheel member and bearing at one end against said ring.

6. In a clutch, a wheel member carrying a fixed shoe, a spring released movable shoe arranged at one side of and loosely supported from the fixed shoe, a supporting journal extending beyond one side of the wheel member, a rotatable hub sleeve having an antifriction bearing on said journal and carrying a friction disk arranged between the two shoes, a sliding clutch collar mounted on the hub sleeve, a shipper connection for said collar, and a plurality of suitably supported cams operating against the movable shoe and having lever arms pivotally connected with said collar.

Signed at Holyoke, in the county of Hampden and State of Massachusetts, this third day of February A. D., 1906.

CHARLES R. GREUTER.

Witnesses:
M. L. JUDD,
A. L. GREEN.